United States Patent
Apel et al.

(10) Patent No.: US 6,546,147 B1
(45) Date of Patent: Apr. 8, 2003

(54) METHOD OF AND DEVICE FOR ANALOG SIGNAL PROCESSING

(75) Inventors: Uwe Apel, Neckartailfingen (DE); Bernd Höfflinger, Sindelfingen (DE); Ulrich Seger, Magstadt (DE)

(73) Assignee: Institut Fur Mikroelectronik Stuttgart (DE)

( * ) Notice: Subject to any disclaimer, the term of this patent is extended or adjusted under 35 U.S.C. 154(b) by 0 days.

(21) Appl. No.: 09/341,267

(22) PCT Filed: Dec. 29, 1997

(86) PCT No.: PCT/DE97/03025
§ 371 (c)(1), (2), (4) Date: Aug. 30, 1999

(87) PCT Pub. No.: WO98/30975
PCT Pub. Date: Jul. 16, 1998

(30) Foreign Application Priority Data

Aug. 1, 1997 (DE) .......................................... 197 00 382

(51) Int. Cl.$^7$ ......................... G06K 9/40; H04N 1/195; H04N 3/15; H04N 5/335
(52) U.S. Cl. ...................... 382/260; 382/318; 348/302; 348/303; 358/482
(58) Field of Search ................................. 382/260, 312; 348/294, 302, 303; 358/482, 479; 257/231; 250/208.1, 208.2

(56) References Cited

U.S. PATENT DOCUMENTS

| | | | |
|---|---|---|---|
| 5,153,731 A | 10/1992 | Nagasaki et al. | ........... 348/294 |
| 5,412,422 A | * 5/1995 | Yamada et al. | ............. 348/304 |
| 5,440,079 A | 8/1995 | Mathur et al. | |
| 6,198,089 B1 | * 3/2001 | Shi | .......................... 250/208.2 |

FOREIGN PATENT DOCUMENTS

| | | |
|---|---|---|
| EP | 0 676 764 A2 | 10/1995 |
| EP | 0676764 A2 | 10/1995 |
| JP | 0676764 A3 | 10/1995 |

OTHER PUBLICATIONS

M. Tremblay, et al., MAR: An Integrated System for Focal Plane Edge Tracking with Parallel Analog Processing and Built–in Primitives for Image Acquisition and Analysis, 1990 IEEE, pp. 292–298.
M. Tremblay, et al., MAR: An Integrated System for Focal Plane Edge Tracking with Parallel Analog Processing and Built–in Primitives for Image Acquisition and Analysis, *1990 IEEE* 10th International Conference on Pattern Recognition, Jun. 16–21, 1990, pp. 292–298.

* cited by examiner

Primary Examiner—Scott Rogers
(74) Attorney, Agent, or Firm—St. Onge Steward Johnston & Reens LLC

(57) ABSTRACT

What is described here is a method of analog signal processing of video signals from picture elements arranged in an array, which are adapted for discrete scanning in terms of time, using a resistive network, the so-called electronic retina, having a two-dimensional field structure including a number of lines m smaller than the number of lines p of the picture element array, wherein the video signals are transmitted from the picture elements in the electronic retina by lines in such a manner that, starting with the first line of picture elements, the video signals are transmitted into the first line of said electronic retina until after the transmission of the video signals from the m-th line of the picture element arrays into the m-th line of said electronic retina the picture elements of the m+1$^{st}$ line of the picture element array are transmitted into the electronic retina, starting again with the first line, until the p-th line of the picture element array is transmitted in a roll-over manner into the electronic retina, and that between every two successive operations of roll-over transmission of video signals to said electronic retina the respective retina lines are read out via an independent signal line without any influence on the transmission operation.

8 Claims, 3 Drawing Sheets a)

b)

c)

d)

e)

METHOD OF AND DEVICE FOR ANALOG SIGNAL PROCESSING

FIELD OF THE INVENTION

The invention relates to a method of analog signal processing of video signals from picture elements arranged in an array, which are adapted for discrete scanning in terms of time, using a resistive network. Moreover, a device in this respect is described.

PRIOR ART

In analog image processing resistive networks, which are often also referred to as electronic retina, are used for filtering the video data. These devices serve the purpose, inter alia, of intensified representation of edges in the video data by a vertically exaggerated transition in contrast; continuous signal variations with a lower local frequency (as they are caused, for instance, by drifting signals) should be suppressed and represented by a signal of medium intensity.

Compared against filter operations performed on digital computers the analog video processing technique offers the advantage that the video data is processed in parallel so that a higher processing rate can be achieved at a reasonable expenditure in terms of hardware.

When the picture elements of video sensors are processed which have a flat configuration and are composed of individual picture elements arranged in an array, each picture element must be imaged onto a node of the resistive network, i.e. the electronic retina, where a circuitry is provided for signal transmission and forwarding. The video information of each picture element is three-dimensionally filtered by forming the difference between the potential distribution occurring on the resistive network, on the one hand, and the actual halftone picture achieved.

Such an integrated solution of the video sensor and the electronic retina is described by M. A. Sivilotti, M. A. Mahowald, and C. A. Mead in: "Real-Time Visual Computations Using Analog CMOS Processing Arrays", Stanford Conference VLSI, Cambridge, MIT Pres., pp. 295–312, 1987, as well as by H. Kobayashi and J. L. White, and A. A. Abidi in: "An Analog CMOS Network for Gaussian Convolution with Embedded Image Sensing", IEEE International Solid-State Circuits Conference, pp. 216–217, 1990. The known solutions, however, present a distinctly reduced three-dimensional resolution and a lower filling factor as a result of the increased number of devices which are required per picture element. In combination with the small image field size which can be realised optical effects such as aliasing produce an interfering effect.

The achievable image field size is, however, also restricted in the case of a separate retina device (without a separate sensor) for pre-processing video data which is recorded with an independent camera. Even when such a device is manufactured in a highly integrated process only sectional images can be processed with the chip sizes available, which sectional images represent only an insufficient patch from the total image.

System arrangements with parallel application of several retina devices are fundamentally realisable but the advantage which the analog processing promises in terms of system costs, processing time and stray power in comparison against digital image processing systems, is minimised by such a set-up.

BRIEF DESCRIPTION OF THE INVENTION

The invention is now based on the problem of providing a method of analog signal processing of video signals from picture elements arranged in an array, which are adapted for discrete scanning in terms of time, using a resistive network, in a form permitting the processing of signals from two-dimensional sensor arrays having a distinctly wider area than the processing network as such. In particular, the invention aims at an improvement of the demands in terms of efficiency and area, as they prevail, for instance, in current image pick-up devices.

The solution to the problem supporting t he present invention is the subject matter of claim 1. An inventive device for carrying through the inventive method according to claim 1 as the subject matter of claim 7. Features relating to an expedient improvement of the inventive idea are the subject matters of the dependent claims.

The invention starts out from the idea to operate the array of the electronic retina in a "roll-over" mode. The video sensor having a flat configuration is quasi "rolled over" by an electronic retina which has preferably the shape of a cylindrical structure, wherein a video signal is transmitted from the picture elements arranged in the video sensor array to the individual network nodes of the electronic retina. The figurative comparison with a retina rolled up to form a cylinder serves for a better understanding of the signal transmission which takes place by means of an appropriate addressing of the picture elements and node points on the retina for signal transmission.

In accordance with the present invention the method of analog signal processing of video signals from picture elements arranged in an array, which are adapted for discrete scanning in terms of time, using a resistive network, the so-called electronic retina, having a two-dimensional field structure including a number of lines m smaller than the number of lines p of the picture element array, wherein the video signals are transmitted from the picture elements in the electronic retina by lines, is characterised by the features that, starting with the first line of picture elements, the video signals are transmitted into the first line of the electronic retina until after the transmission of the video signals from the m-th line of the picture element arrays into the m-th line of the electronic retina the picture elements of the $m+1^{st}$ line of the picture element array are transmitted into the electronic retina, starting again with the first line, until the p-th line of the picture element array is transmitted in a roll-over manner into the electronic retina, and that between every two successive operations of roll-over transmission of video signals to the electronic retina the respective retina lines are read out via an independent signal line without any influence on the transmission operation.

The inventive use of the electronic retina offers a problem solution by a multiple use of the resistive network which could also be referred to as time multiplexing or roll-over operation.

With the electronic retina not comprising a sensor part there is no invariable allocation between the circuit elements of the resistive network and the geometric picture elements of the video sensor having an array configuration so that an optional assignment of individual network areas of the electronic retina may be made for image processing.

The resistive network, which is constituted by retina elements, typically presents a network characteristic with a restricted remote effect which behaves like an equivalent of the Gaussian function employed in digital filter operations. The coherence lengths usually employed in image processing are substantially smaller than 5. This means that only a limited number of adjacent picture elements takes an influence on the output value of a picture element. Potential influences over a distance exceeding three coherence lengths (K) disappear in noise.

For a transmission of the sensor signals by lines this means that after the read-out of the retina image data from line n into line n-k with k=ck new video data may be written. The new video information need not be expected to take an influence on the retina output if the constant c is selected to be higher than 3.

The decisive advantage of the invention resides in the aspect that a retina with a limited number of lines can be used for real-time processing of video information of a camera chip with a large number of lines.

BRIEF DESCRIPTION OF THE DRAWING

The invention will now be described in the following, without any restriction of the general inventive idea, by exemplary embodiments with reference to the drawing wherein.

Ways of Implementation of the Invention, Industrial Applicability

Figure 1:
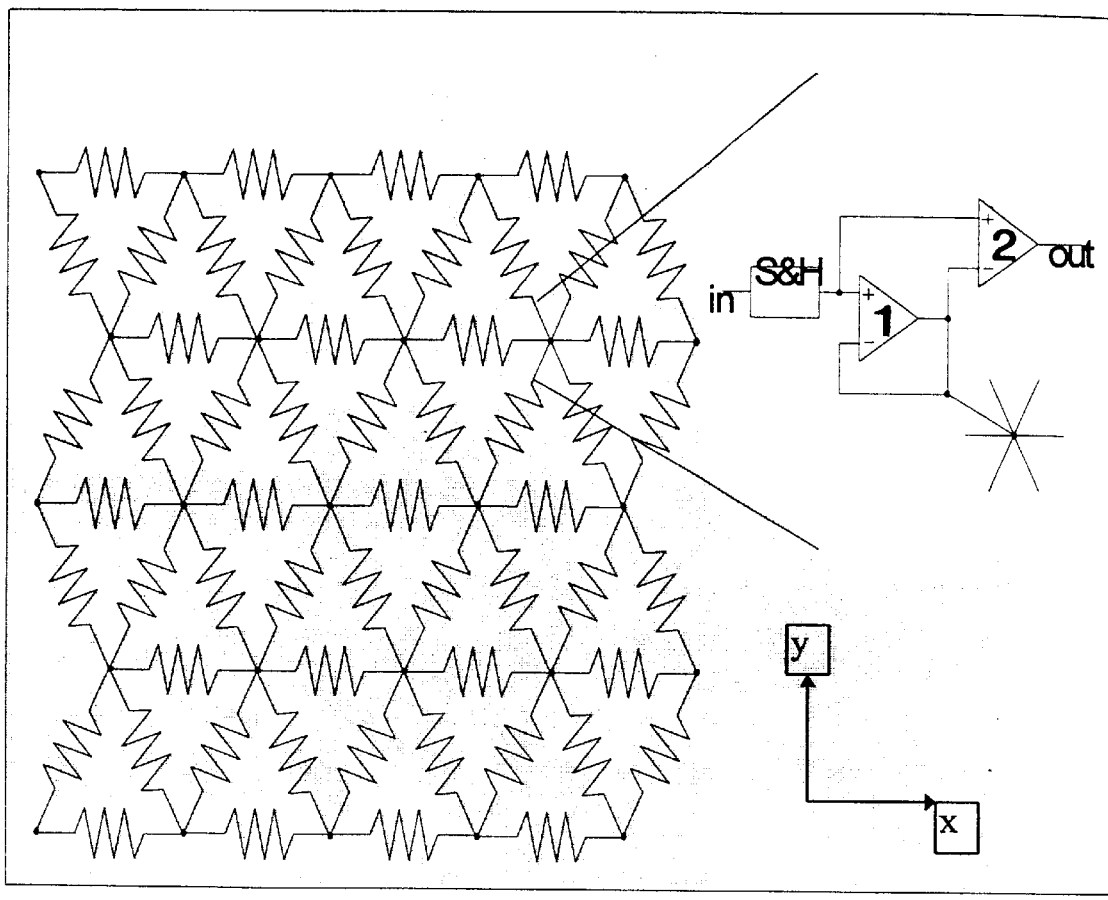
FIG. 1 illustrates the fundamental structure of an independent "electronic retina" for processing sensor signals scanned in a discrete manner in terms of time.

An arrangement known per se of a resistive network is shown in FIG. 1. The electronic retina structured in the form of a network consists of a two-dimensional array of meshes including a plurality of individual circuits whereof one is illustrated in an enlarged view. The circuits, which are provided each on the nodes of the network array comprise a sample-and-hold (S&H) unit with two amplifiers 1 and 2 connected in the circuit. The circuit serves to transmit the video signals from each picture element to the network. Moreover, the S&H unit provides for a delayed read-out of all the video signals transmitted into the network.

With the field size of the electronic retina having dimensions smaller than the size of the video sensor array and with an invariable allocation not existing between the picture elements and the meshes of the network, the retina must be moved relative to the surface of the video sensor for a complete transmission of the video signals of the video sensor, so that every picture element of the video sensor will be contacted with a node in the retina mesh for signal transmission.

In a preferred embodiment the retina is actually rolled over the flat video sensor, in a figurative sense, to achieve this aim. To this end the retina should be imagined as being rolled up to form a cylinder contacting the video sensor over its generated surface. As a result of the linear contact area between the video sensor and the retina the signals are transmitted by lines between the video sensor and the retina. The signal transmission is implemented by means of an appropriate addressing in correspondence with the afore-described case.

The extension of the retina along the Y-direction, as illustrated in FIG. 1, is assumed to be 2*k and is used in a roll-over manner as described in the foregoing. On such an assumption it becomes possible to integrate a retina for frame processing on a single chip. The structure of the number of lines of 2*k must be so selected that the resistive network will have sufficient time for transient response before the output of the result (see above: c>3).

Figure 2:
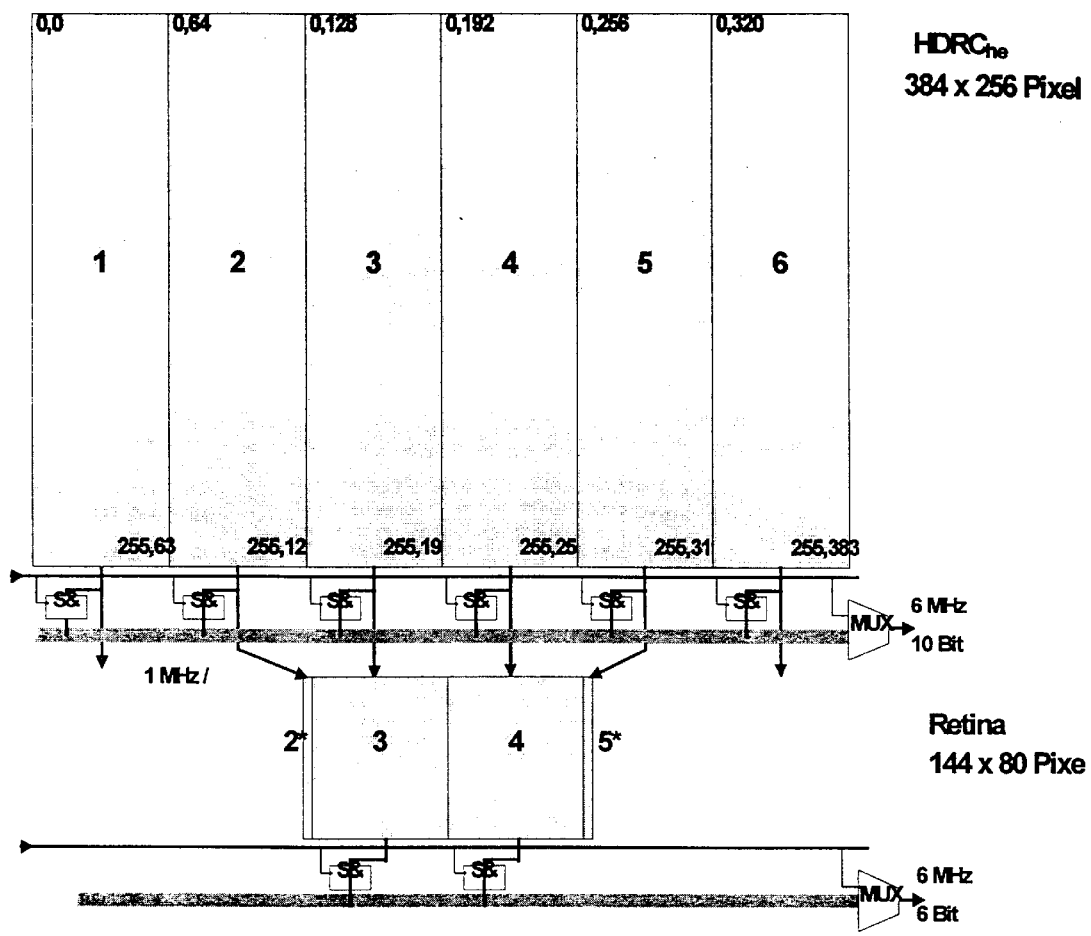
FIG. 2 shows a schematic arrangement between the picture element array of the video sensor and the electronic retina.

FIG. 2 illustrates a schematic view of a video signal transmitter of a HDRC camera chip having an image field size of 384*256 pixels in an hexagonal array. The length of the lines is subdivided into 6 segments whereof each includes 64 pixels, so as to achieve a higher data throughput on account of parallel read-out of the partial lines at a pixel cycle of 1 MHz. The pixel and line cycles of both the video chip and the retina are synchronised. The retina, which has an image field size of 144*80 pixels, is designed for processing the video data of 2 segments of the camera chip. On each outer side of the retina eight lines or columns, respectively, are added for suppressing marginal influences created by the resistive network whilst only the data from the core area of 128*64 pixels is output for the continuing image processing. The marginal columns are loaded by linking to the corresponding segments of the camera device. For a correct definition of the video data at the upper and lower picture edges an appropriate functional logic must be incorporated into the internal line controller in the retina. The retina controller is so designed that it can optionally be operated in the roll-over operating mode.

In a concrete structure of the present retina two chains of shift registers are designed for column addressing: in the first chain the respective line is addressed for data input whilst in the second chain the respective line for data output is addressed. In roll-over mode the second shift register chain is started with a delay of 32 line cycles relative to the read-in line. As in this mode only the video information of the core area is output with a height of 64 lines the first line of the transient retina image will appear by that point of time by which the $41^{st}$ line is transferred from the camera chip into the retina. When the $32^{nd}$ line of the retina image has been read out the second vertical picture section of the camera chip can be written into the retina. In this manner it becomes possible to process the complete frame height of the HDRC camera of 256 lines.

The processing flow of the retina requires that 80 lines be read in from the camera for every 64 image lines effectively processed. This requirement is taken into account by the provision that the retina lines 0 to 15 and 64 to 79 are simultaneously and identically written for the following images.

To this end a feed-back loop has been inserted in the first shift register, which has a length of 80 bits, behind the flip-flop 63. In the overflow zone always two lines are addressed for writing so that marginal effects are not generated at the interfaces between two consecutive partial retina images.

FIGS. 3a–e show each an exemplary picture to illustrate the sequential pick-up technique using the roll-over retina.

Figure 3:
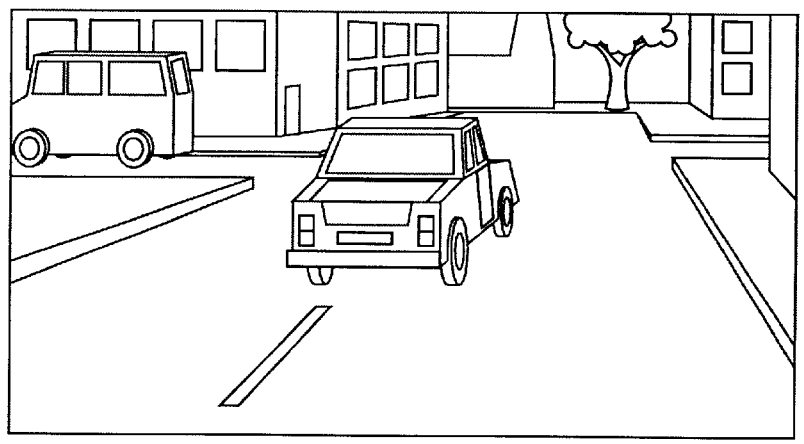
FIGS. 3a–e are views of picture sequences picked up with the inventive roll-over retina.
Figure 3:
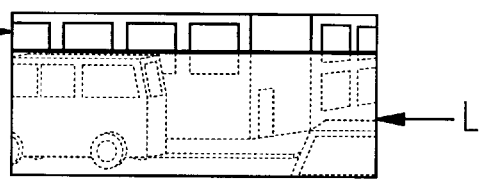
Figure 3:
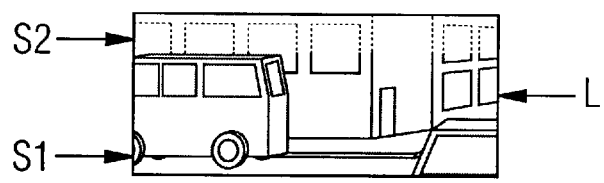
Figure 3:
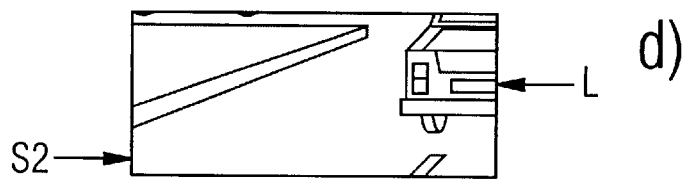
Figure 3:
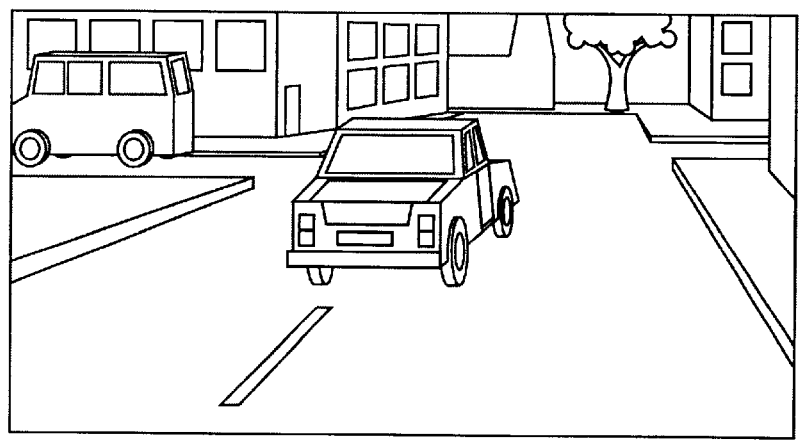

FIG. 3a is a simulated picture of a hexagonal logarithmic sensor having a low resolution. The high scene contrast is picked up completely whilst essential information about differences in reflection is retained and can be intensified by postprocessing.

FIG. 3b shows a first phase of the picture transferred to the retina. The writing vector S1 is currently in the upper third of the array whilst in the immediate vicinity of the actual writing position the network nodes have not yet reached the transient state. The read-out operation is not yet performed.

The read-out vector in FIG. 3c follows the writing vector S1 with a delay by n lines. The first writing vector S1 has already reached the lower end of the processing array, the writing operation has been performed in parallel in the overlapping zone by a second writing vector S2 over several lines already, and the original data rolls over the processing network. The reading vector L is positioned at the end of the reading zone and at a short distance ahead of the roll-over zone. The next valid reading position is n lines behind the writing vector S2.

In correspondence with FIG. 3d the second writing vector S2 is a short distance ahead of the lower overlapping zone (in which the picture content of the last picture processing cycle can still be recognised). The next writing vector is activated when the next data line is reached. The original picture has been processed in real time over the entire height of the original picture along a width of the processing network in accordance with FIG. 3e. The processing data is available with a delay by n lines, with n corresponding to three times the coherence length. The supply of halftones has been reduced and at the same time relevant picture areas have been emphasised (cf. the perceptibility of the trailer coupling between the original and the processed image.)

LIST OF REFERENCES 1 amplifier
2 amplifier
S&H sample-and-hold circuit
S1 first writing vector
S2 second writing vector
L reading vector

What is claimed is:

1. Method of analog signal processing of video signals from picture elements arranged in an array, which are adapted for discrete scanning in terms of time, using a resistive network, the so-called electronic retina, having a two-dimensional field structure including a number of lines m smaller than the number of lines p of the picture element array, wherein the video signals are transmitted from the picture elements in the electronic retina by lines in such a manner that, starting with the first line of picture elements, the video signals are transmitted into the first line of said electronic retina until after the transmission of the video signals from the m-th line of the picture element arrays into the m-th line of said electronic retina the picture elements of the m+1$^{st}$ line of the picture element array are transmitted into the electronic retina, starting again with the first line, until the p-th line of the picture element array is transmitted in a roll-over manner into the electronic retina, and that between every two successive operations of roll-over transmission of video signals to said electronic retina the respective retina lines are read out via an independent signal line without any influence on the transmission operation.

2. Method according to claim 1, characterised in that said operation of transmission of video signals to said electronic retina is performed by means of at least one writing vector and that the read-out operation is performed by means of a reading vector.

3. Method according to claim 2, characterised in that the distance n–k between a line n in said electronic retina, from which said video signals are read, and a line k into which new video signals are transferred is set to 3 to 5 times the coherence length of said retina at minimum.

4. Method according to claim 1, characterised in that the lines of said picture elements arranged in an array are subdivided into column segments, and that the video signals in each column segment are transferred by successive lines completely to said electronic retina.

5. Method according to claim 1, characterised in that addressing is performed for both the transmission operation and the read-out operation, which addressing operations take place independently of each other.

6. Method according to claim 1, characterised in that said operation of transmission in said electronic retina is performed by adjustment of a local balance persisting for a period up to achievement of the balanced state, which is shorter than the distance in time between a transmission operation and the read-out operation in one line.

7. Device for analog signal processing of video signals from picture elements arranged in an array, which are adapted for discrete scanning in terms of time, using a resistive network, the so-called electronic retina, having a two-dimensional field structure including a number of lines m smaller than the number of lines p of the picture element array, wherein the video signals are transmitted from the picture elements in the electronic retina by lines, for carrying through the method according to any of the claims 1 to 6, characterised in that separate signal lines and signal processing components are provided for transmitting said video signal data into said electronic retina and for the reading operation.

8. Device according to claim 7, characterised in that said electronic retina presents a mesh structure provided with a uniformly controllable conductivity for operational adjustment to the coherence length operative on the analog image processing operation.

* * * * *